(12) United States Patent
Wassermann et al.

(10) Patent No.: US 8,860,583 B2
(45) Date of Patent: Oct. 14, 2014

(54) MUD CHANNEL CHARACTERIZATION OVER DEPTH

(75) Inventors: Ingolf Wassermann, Houston, TX (US); John D. Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 669 days.

(21) Appl. No.: 12/416,218

(22) Filed: Apr. 1, 2009

(65) Prior Publication Data

US 2009/0251331 A1 Oct. 8, 2009

Related U.S. Application Data

(60) Provisional application No. 61/042,026, filed on Apr. 3, 2008.

(51) Int. Cl.
 *E21B 47/18* (2012.01)
 *G01V 11/00* (2006.01)
 *E21B 47/10* (2012.01)

(52) U.S. Cl.
 CPC .............. *G01V 11/002* (2013.01); *E21B 47/18* (2013.01); *E21B 47/10* (2013.01)
 USPC ......................................... 340/854.3; 367/83

(58) Field of Classification Search
 USPC .......................................... 367/83; 340/854.3
 See application file for complete search history.

(56) References Cited

U.S. PATENT DOCUMENTS

| | | | |
|---|---|---|---|
| 4,866,680 A * | 9/1989 | Scherbatskoy | ................... 367/83 |
| 5,113,379 A | 5/1992 | Scherbatskoy | |
| 5,182,730 A | 1/1993 | Scherbatskoy | |
| 5,969,638 A * | 10/1999 | Chin | ......................... 340/855.3 |
| 6,088,294 A | 7/2000 | Leggett, III et al. | |
| 8,004,421 B2 * | 8/2011 | Clark | ......................... 340/854.4 |
| 2005/0200498 A1 | 9/2005 | Gleitman | |
| 2005/0279532 A1 * | 12/2005 | Ballantyne et al. | .............. 175/40 |
| 2005/0283315 A1 | 12/2005 | Haughland | |
| 2005/0284659 A1 * | 12/2005 | Hall et al. | ........................ 175/27 |

OTHER PUBLICATIONS

International Preliminary Report on Patentability and Written Opinion; PCT/US2009/039886; WO mailed Feb. 26, 2010.

* cited by examiner

*Primary Examiner* — John Kreck
(74) *Attorney, Agent, or Firm* — Cantor Colburn LLP

(57) ABSTRACT

A system for optimizing a mud-pulse telemetry system, the system including: a plurality of sensors distributed along a drill string adapted for being disposed in a borehole, each sensor configured to perform a measurement of a characteristic of at least one of mud in a column within the borehole and a mud-pulse telemetry signal propagating in the mud; and a processing unit for receiving the measurements, the processing unit comprising an algorithm to compile a data set from the measurements and to determine a parameter of the mud-pulse telemetry system using the data set to optimize the mud-pulse telemetry system. A method and a computer program product are also provided.

17 Claims, 4 Drawing Sheets

MUD CHANNEL CHARACTERIZATION OVER DEPTH

CROSS REFERENCE TO RELATED APPLICATION

This application is a non-provisional of U.S. Ser. No. 61/042,026, filed Apr. 3, 2008, the contents of which are incorporated by reference herein in their entirety.

BACKGROUND OF THE INVENTION

1. Field of the Invention

The invention disclosed herein relates to optimizing telemetry using a mud column as a transmission medium.

2. Description of the Related Art

Exploration and production of hydrocarbons generally requires the use of a bottom hole assembly disposed in a drill string. Different bottom hole assemblies can be used to perform several tasks in a borehole. For instance, a bottom hole assembly can be used for well logging or sample testing of a formation.

In some instances, when the bottom hole assembly performs a task, at least one result of the task needs to be transmitted uphole to the surface of the earth. Mud-pulse telemetry is a technique for transmitting data from the bottom hole assembly to the surface of the earth. Mud-pulse telemetry can also be used to transmit data or commands from the surface of the earth to the bottom hole assembly.

Mud-pulse telemetry uses at least one of pressure and flow fluctuations of mud in a column in the borehole. The characteristics of the mud column as a transmission medium for telemetry signals depend on a multitude of factors. The factors include mud type, depth in the borehole, number of pumps pumping the mud, physical condition of the pumps, and flow rate of the mud. Consequently, the factors can affect the signal to noise ratio of signal transmissions. The signal to noise ratio can limit the amount of data that can be transmitted per unit of time (i.e., limit bandwidth). Certain applications require a bandwidth greater than the bandwidth a traditional mud-pulse telemetry system can provide.

Therefore, what are needed are techniques to improve the bandwidth of mud-pulse telemetry.

BRIEF SUMMARY OF THE INVENTION

Disclosed is a system for optimizing a mud-pulse telemetry system, the system including: a plurality of sensors distributed along a drill string adapted for being disposed in a borehole, each sensor configured to perform a measurement of a characteristic of at least one of mud in a column within the borehole and a mud-pulse telemetry signal propagating in the mud; and a processing unit for receiving the measurements, the processing unit comprising an algorithm to compile a data set from the measurements and to determine a parameter of the mud-pulse telemetry system using the data set to optimize the mud-pulse telemetry system.

Also disclosed is a method for optimizing mud-pulse telemetry, the method including: placing a drill string in a borehole, the drill string comprising a plurality of sensors distributed along the drill string, each sensor configured to perform a measurement of a characteristic of at least one of mud in a column within the borehole and a mud-pulse telemetry signal propagating in the mud; receiving measurements from the plurality of sensors; compiling a data set from the measurements; and processing the data set to optimize the mud-pulse telemetry.

Further disclosed is a computer program product stored on machine-readable media for optimizing a mud-pulse telemetry system, the product having machine-executable instructions for: receiving measurements from a plurality of sensors distributed along a drill string disposed in a borehole, each sensor configured to perform a measurement of a characteristic of at least one of mud in a column within the borehole and a mud-pulse telemetry signal propagating in the mud; compiling a data set from the measurements; quantifying at least one of noise in the mud column and distortion in a mud-pulse telemetry signal in the mud column using the data set; and sending a signal to the mud-pulse telemetry system to correct for at least one of the noise and the distortion to optimize the mud-pulse telemetry.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
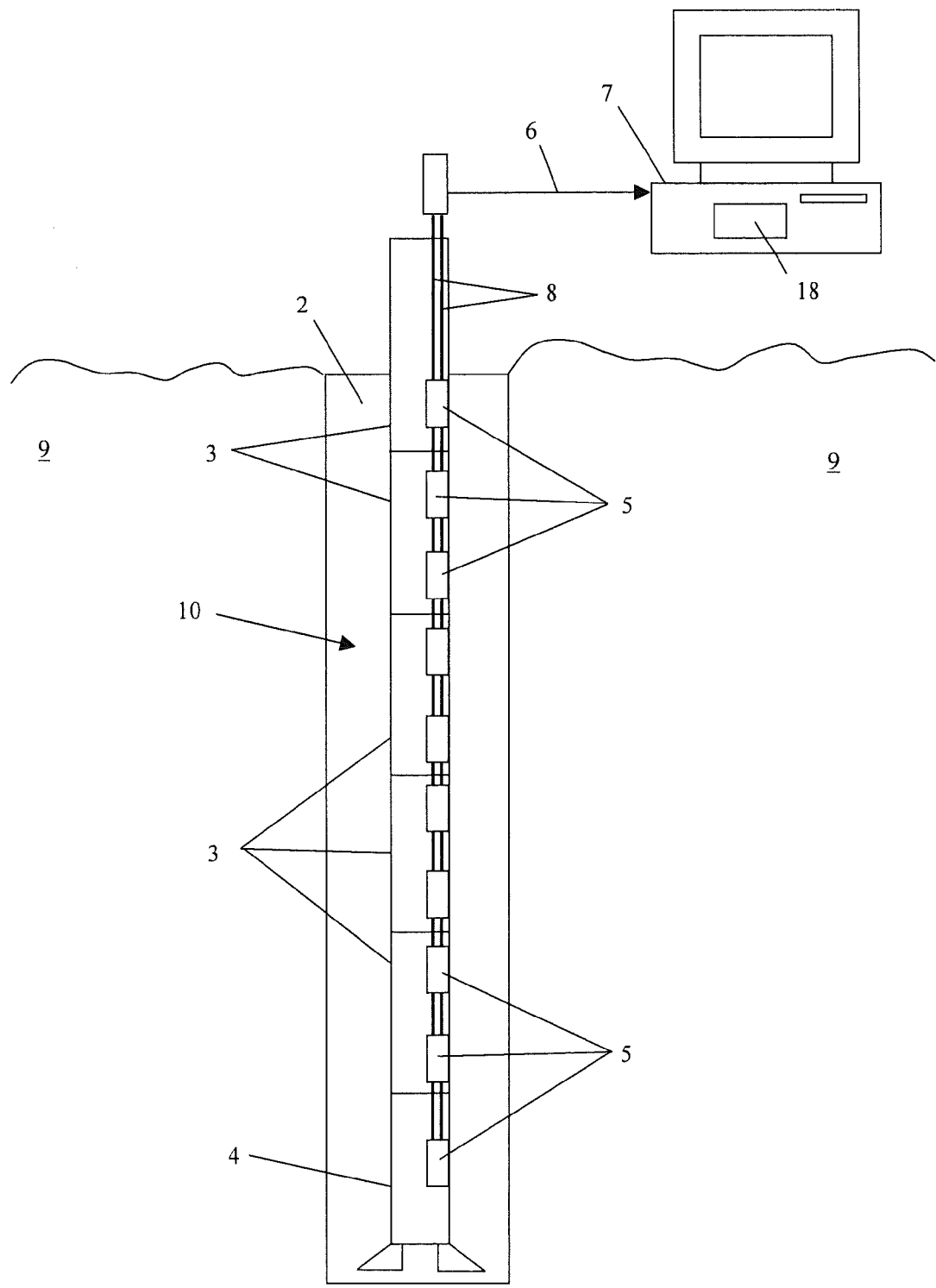
FIG. 1 illustrates an exemplary embodiment of a plurality of sensors distributed along a drill string.

Disclosed are examples of techniques for optimizing mud-pulse telemetry. However, one skilled in the art will recognize that the techniques are illustrative and not limiting of the teachings herein. The techniques, which include systems and methods, use a plurality of sensors distributed along a drill string. The sensors measure at least one characteristic of mud in a column defined by the borehole in which the drill string is disposed or the interior of a drill string through which the mud flows. Each sensor provides a measurement that corresponds to the depth of the sensor. Thus, by knowing the characteristics of the mud through the column, parameters controlling the mud-pulse telemetry can be selected or adjusted to optimize the mud-pulse telemetry.

For convenience, certain definitions are presented for use throughout the specification. The term "drill string" relates to at least one of drill pipe and a bottom hole assembly. In general, the drill string includes a combination of the drill pipe and the bottom hole assembly. The bottom hole assembly may be a drill bit, sampling apparatus, logging apparatus, or other apparatus for performing other functions downhole. As one example, the bottom hole assembly can be a drill collar containing measurement while drilling (MWD) apparatus. The term "sensor" relates to a sensor that can measure at least one characteristic of mud in the mud column. Non-limiting examples of the characteristic include pressure, flow rate, temperature, and density. The term "distributed along the drill string" relates to the sensors being located at the drill string along the mud column from substantially the surface of the earth to a point of the drill string where mud-telemetry signals are generated.

The term "mud-pulse telemetry" relates to a system for transmitting information such as data and commands using a column of mud as a transmission medium. The information is transmitted using at least one of fluctuations of pressure and flow rate of the mud. The information can be transmitted from the bottom hole assembly uphole to the surface of the earth (i.e., uplink). Similarly, the information can be transmitted from the surface of the earth downhole to the bottom hole assembly (i.e., downlink). During well operations, mud is pumped into the bore of the drill string using techniques known in the art. The mud flows through the drill string and exits through nozzles, which are located in a downhole drill bit. The mud returns to the surface in the annular space defined by the exterior of the drill string and the interior of the borehole. Either column of mud (i.e., interior or exterior of the drill string) can be used for signal transmission. During uplink communications, a downhole electronics unit receives information from a downhole device and encodes the information into a series of pulses in a mud column using a pulse generator. The series of pulses or fluctuations in pressure is referred to as a "mud-pulse telemetry signal." In one embodiment, the pulse generator generates a fluctuation or pulse by venting the mud in the drill string through an orifice. Each time the orifice vents mud a pulse is generated. In another embodiment, the pulse generator generates a fluctuation or pulse by periodically restricting the flow of fluid within the drillstring. A transducer located at the surface receives the pulse and converts the pulse into an electrical signal that can be received and processed by a processing unit. Preferably, the processing unit includes a computer processing system for executing program instructions. Using the processing system, an operator can receive the information.

The term "coupled" relates to either a direct or an indirect connection between two items such that other items may intervene between the two items. The term "optimize" relates to at least one of increasing a signal to noise ratio, increasing a telemetry bandwidth, increasing a data transfer rate, and decreasing a bit error rate. Anyone of these optimization improvements can result in increasing the reliable data rate of the mud-pulse telemetry.

FIG. 1 illustrates an exemplary embodiment of a drill string 10 in a borehole 2 penetrating the earth 9. The drill string 10 includes drill pipes 3 and a bottom hole assembly 4. A plurality of sensors 5 is distributed along the drill string 10. The plurality of sensors 5 measure at least one property or characteristic of a mud column or a mud-pulse telemetry signal traveling in the mud column. The mud column can be interior to or exterior to the drill string 10. Accordingly, the sensors 5 can be located at least one of interior to and exterior to the drill string 10. In addition, the sensors 5 are spaced close enough together to resolve changes in the at least one property or characteristic through the length of the mud column. Measurements from the sensors 5 are transmitted as data 6 to a surface processing unit 7 using a high bandwidth communication system 8.

One example of the high bandwidth communication system 8 includes "wired pipe." In one embodiment of wired pipe, the drill pipe 3 is modified to include a broadband cable (formed by, for example, a co-axial cable) protected by a reinforced steel casing. At the end of each drill pipe 3, there is an inductive coil, which contributes to communication between two drill pipes 3. In this embodiment, the broadband cable is used to transmit the data 6 to the surface processing unit 7. About every 500 meters, a signal amplifier is disposed in operable communication with the broadband cable to amplify the data 6 to account for signal loss. The surface processing unit 7 receives the data 6 from the drill pipe 3 at the surface of the earth 9 in the vicinity of the borehole 2 or other desired remote location.

One example of wired pipe is INTELLIPIPE® commercially available from Intellipipe of Provo, Utah, a division of Grant Prideco. One example of the high bandwidth communication system 8 using wired pipe is the INTELLISERV® NETWORK also available from Grant Prideco. The Intelliserv Network has data transfer rates from fifty-seven thousand bits per second to one million bits per second. The high speed data transfer enables sampling rates of the measured parameters at up to 200 Hz or higher with each sample being transmitted to the surface of the earth 9.

The high bandwidth communication system 8 can also include an optical fiber affixed to the drill string 10 as a transmission medium. Other transmission media may include electromagnetic (EM) telemetry or acoustic telemetry as the high bandwidth communication system.

Figure 2:
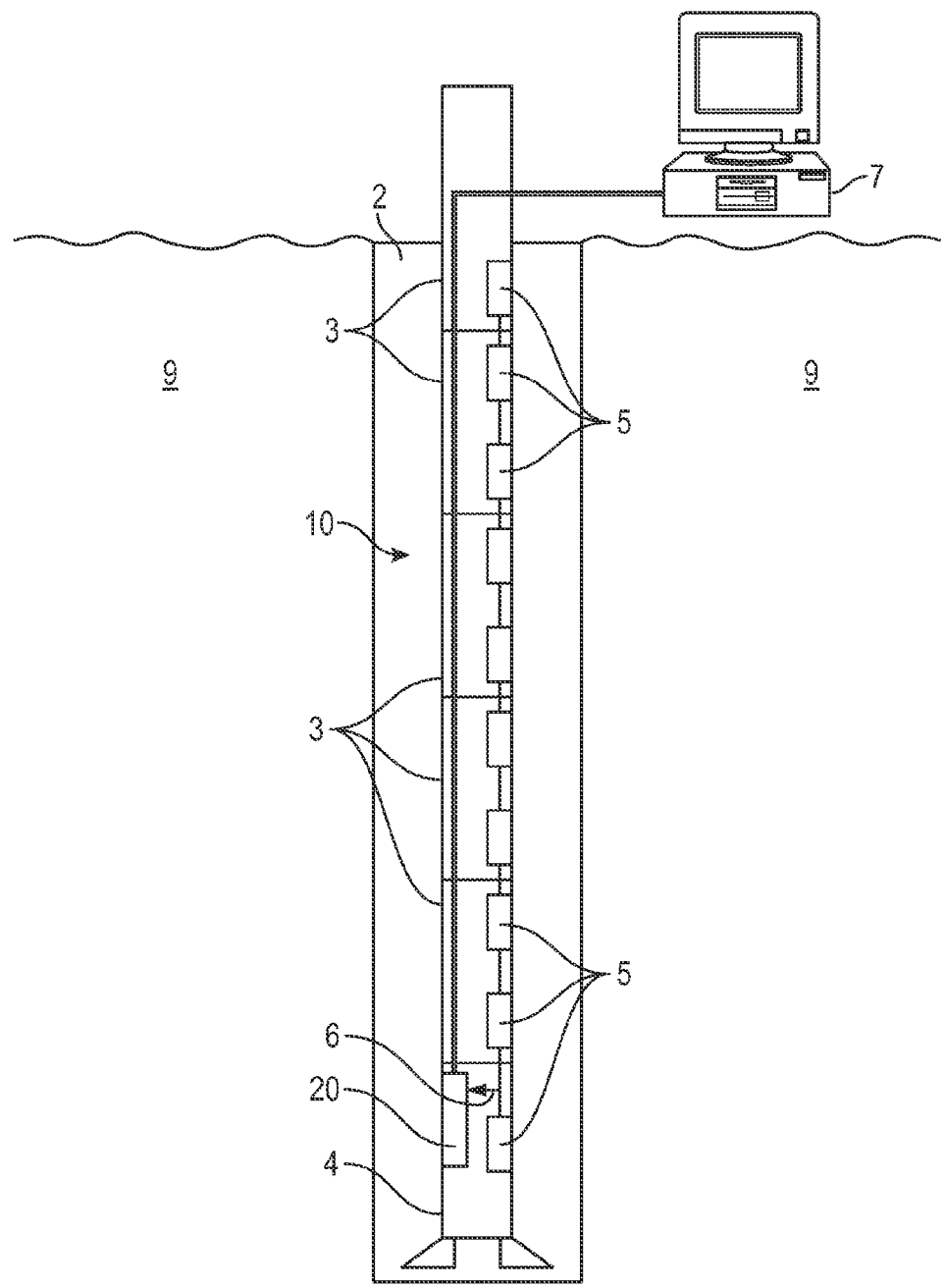
FIG. 2 illustrates another exemplary embodiment of the drill string with the plurality of sensors.

FIG. 2 illustrates another exemplary embodiment of the techniques disclosed herein. Referring to FIG. 2, the data 6 from the plurality of sensors 5 is stored in memory 20. Once the drill string 10 is removed from the borehole 2, the data 6 can be retrieved from the memory 20 and entered into the surface processing unit 7. The memory 20 can be a central memory location or the memory 20 can be distributed at various locations along the drill string 10 such as with the sensors 5.

Figure 3:
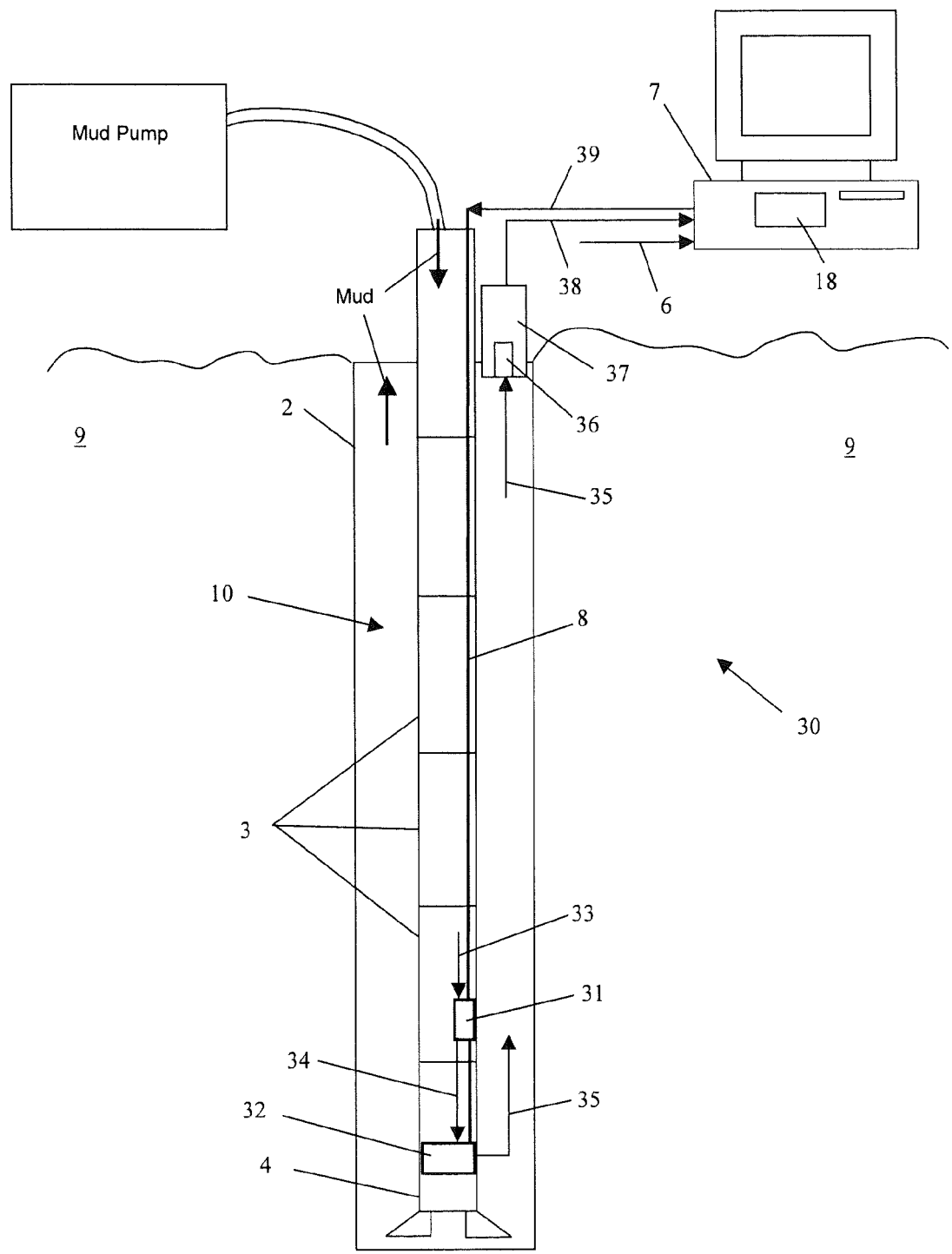
FIG. 3 illustrates an exemplary embodiment of a mud-pulse telemetry system.

FIG. 3 illustrates an exemplary embodiment of a mud-pulse telemetry system 30. The mud-pulse telemetry system 30 includes a downhole electronics unit 31 and a pulse generator 32. The downhole electronics unit 31 receives downhole data 33 from a downhole device and encodes the data 33 into a series of pulses 34. The pulse generator 32 receives the series of pulses 34 and converts the series of pulses 34 into mud pulses 35, which are transmitted to the surface of the earth 9. At the surface of the earth 9, the mud pulses 35 are received by a transducer 36 that is included in a receiver 37. The receiver 37 converts the mud pulses 35 into a telemetry signal 38 that includes downhole data 33. The telemetry signal 38 can be input to a processing unit such as the processing unit 7 for example. In the embodiment of FIG. 3, the processing unit 7 sends a parameter signal 39 to at least one of the downhole electronics unit 31 and the pulse generator 32 to input a parameter of the mud-pulse telemetry system 30.

The teachings herein include optimizing parameters of the pulse generator 32 to increase the bandwidth of the mud-pulse telemetry system 30. Examples of the parameters include pulse rate, pulse amplitude and type of encoding method.

Turning now to the processing unit 7, the processing unit 7 may include a computer processing system. Exemplary components of the computer processing system include, without limitation, at least one processor, storage, memory, input devices (such as a keyboard and mouse), output devices (such as a display) and the like. As these components are known to those skilled in the art, these are not depicted in any detail herein.

Generally, some of the teachings herein are reduced to an algorithm that is stored on machine-readable media. The algorithm is implemented by the computer processing system executing machine-executable instructions and provides operators with desired output.

Once the surface processing unit 7 receives the data 6, the processing unit 7 compiles a data set using an algorithm 18 depicted in FIG. 1. In one embodiment, the data set includes a type of measurement, a measurement value, and a depth at which the measurement was performed. Using the data set, the processing unit 7 determines a parameter of the mud-pulse telemetry system to optimize the mud-pulse telemetry.

Mud-pulse telemetry can be optimized using several techniques. In one technique, noise is quantified in the mud column. Two examples of noise are random noise and pump induced noise. Random noise is generally modeled as white Gaussian noise. However, using the techniques disclosed herein, the type of random noise can be quantified and compared to the white Gaussian noise to determine if the white Gaussian noise is proper for a mathematical model of the mud column. Once the noise is quantified, the noise can be subtracted from the mud-pulse telemetry signal.

Another optimizing technique involves quantifying distortion induced by the mud-pulse telemetry signal traveling and propagating in the mud column. The distortion can be quantified by using any one of several statistical models. Non-limiting examples of distortion that can be modeled with these statistical models include decrease in amplitude resulting from an increase in frequency, incoherence of amplitude and phase, multi-path induced fading, and spectral density shift. As with the quantified noise, once the distortion is quantified it can be subtracted from the mud-pulse telemetry signal.

Still another optimizing technique includes using at least one of the quantified noise and the quantified distortion to select or adjust parameters of the mud-pulse telemetry system 30. Examples of the parameters include pulse rate, pulse amplitude, mud flow rate and encoding method. The encoding method can include at least one of time domain techniques and frequency domain techniques. In addition, other factors can be selected to optimize the bandwidth. These other factors include modifying the location of the transducer receiving the mud pulses uphole, using more than one transducer with different orientations or locations, providing shielding for the transducers, and selecting or modifying pumps to decrease pump noise.

Figure 4:
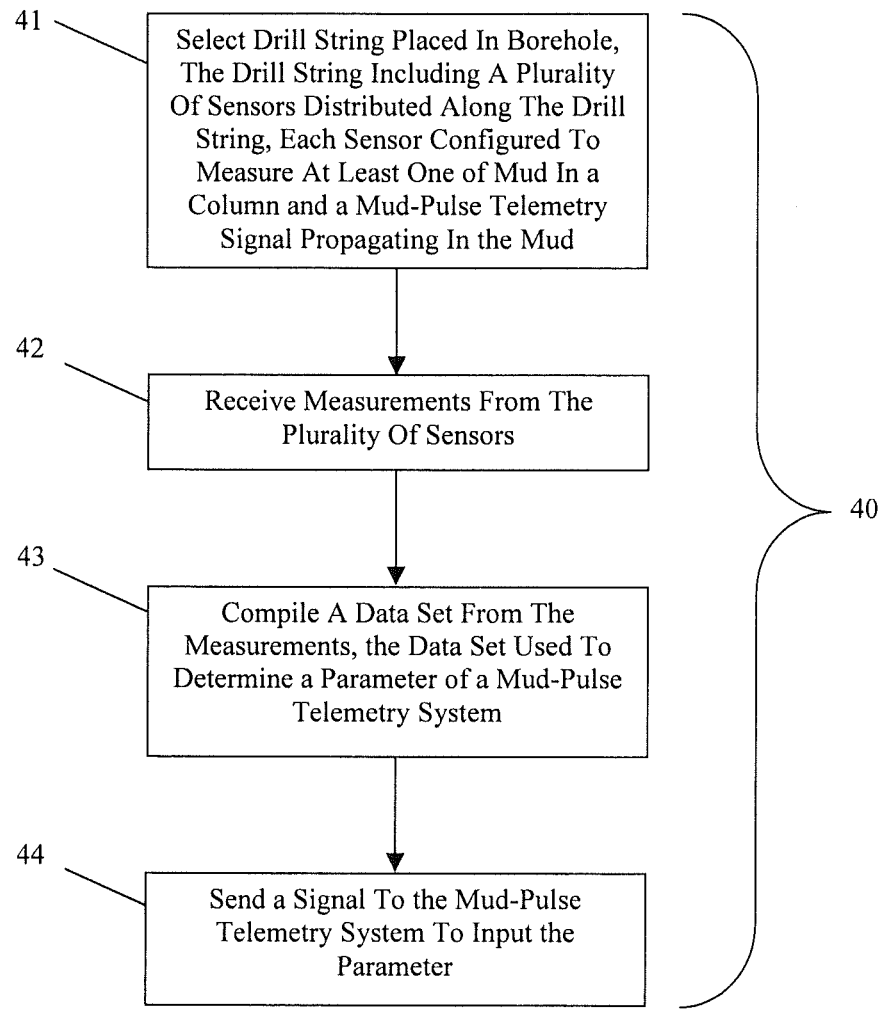
FIG. 4 presents one example of a method for optimizing mud-pulse telemetry.

FIG. 4 presents one example of a method 40 for optimizing the mud-pulse telemetry system 30. The method 40 calls for (step 41) selecting a drill string 10 placed in the borehole 2. The drill string 10 includes the plurality of sensors 5 distributed along the drill string 10. Each sensor 5 is configured to perform a measurement of a characteristic of at least one of mud in a column and the mud-pulse telemetry signal 35 propagating in the mud. Further, the method 40 calls for (step 42) receiving measurements from the plurality of sensors 5. Further, the method 40 calls for (step 43) compiling a data set from the measurements to optimize the mud-pulse telemetry. The data set is used to determine a parameter of the mud-pulse telemetry system. Further, the method 40 calls for (step 44) inputting the parameter to the mud-pulse telemetry system 30.

Accordingly, in various embodiments, wired pipe or other such higher bandwidth systems provide a feedback channel. Although a drillpipe that includes a higher bandwidth system such as a wired drillpipe, generally does not need the bandwidth associated with mud-pulse telemetry, the mud-pulse telemetry can provide an important back-up system to more fragile higher bandwidth systems. Therefore, it is desirable to run mud-pulse in parallel with a higher bandwidth system such as wired pipe in case that the wired pipe system fails. In a situation involving failure of the primary communications system, the mud pulse bandwidth becomes crucial. Therefore, continued monitoring and optimizing of the mud pulse system as long as wired pipe operates successfully provides for reliable operation.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a wired pipe component, a sample line, sample chamber, pump, piston, power supply (e.g., at least one of a generator, a remote supply and a battery), vacuum supply, pressure supply, cooling component, heating component, magnet, electromagnet, sensor, transducer, transducer shield, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A system for optimizing a mud-pulse telemetry system, the system comprising:
   a plurality of sensors distributed along a drill string adapted for being disposed in a borehole for obtaining measurements of a characteristic of mud along a mud column in the borehole from substantially a surface location to substantially a downhole pulse generator, wherein the measurements of the characteristic of the mud includes a measurement of noise in the mud column; and
   a processing unit configured to receive the measurements from the plurality of sensors, model the noise in the mud column to a white Gaussian noise, and subtract the noise from a mud pulse telemetry signal in the mud column.

2. The system as in claim 1, further comprising a memory disposed in the drill string, the memory in operable communication with the plurality of sensors, the memory configured to store the measurements and transfer the measurements to the processing unit.

3. The system as in claim 1, further comprising using a high bandwidth communication system to transfer the measurements from the plurality of sensors to the processing unit.

4. The system as in claim 3, wherein the high-bandwidth communication system is adapted for transmitting data from the plurality of sensors at a rate exceeding 57,000 bits per second.

5. The system as in claim 1, wherein the characteristic of the mud column includes at least one of pressure, flow rate, temperature, and density.

6. The system as in claim 1, wherein the processor is further configured to quantifying a distortion of a mud-pulse telemetry signal in the column.

7. The system as in claim 1, wherein the noise comprises at least one of pump noise and random noise.

8. The system as in claim 6, wherein the processor is further configured to quantify the distortion by modeling at least one of:
 a decrease in amplitude resulting from an increase in frequency;
 incoherence of amplitude and phase;
 multi-path induced fading; and
 spectral frequency shift.

9. The system as in claim 6, wherein the processing unit is configured to send a parameter of the mud-pulse telemetry system to a pulse generator of the mud-pulse telemetry system.

10. A method for optimizing a mud-pulse telemetry system, the method comprising:
 using a drill string disposed in a borehole, the drill string comprising a plurality of sensors distributed along the drill string from substantially a surface location to substantially a downhole pulse generator, each sensor configured to obtain measurements of a characteristic of mud in a column within the borehole, wherein the measurements of the characteristic of mud in the column includes noise;
 receiving the measurements from the plurality of sensors at a processor;
 using the processor to:
 model the noise in the mud column to a white Gaussian noise; and
 subtract the noise from a mud pulse telemetry signal in the mud column.

11. The method as in claim 10, further comprising determining the noise using at least one of noise in the column and a distortion of a mud-pulse telemetry signal in the column.

12. The method as in claim 11, wherein the noise comprises at least one of pump noise and random noise.

13. The method as in claim 11, wherein removing the determined noise further comprises subtracting the noise from the signal in the mud pulse telemetry system.

14. The method as in claim 11, wherein the distortion comprises at least one of:
 a decrease in amplitude resulting from an increase in frequency;
 incoherence of amplitude and phase;
 multi-path induced fading; and
 spectral frequency shift.

15. The method as in claim 10, further comprising sending a parameter of the mud-pulse telemetry system to a pulse generator of the mud pulse telemetry system.

16. The method as in claim 11, further comprising quantifying at least one of noise in the column and a distortion of a mud-pulse telemetry signal in the column.

17. The system of claim 1, wherein the processor is further configured to subtract the determined noise from the mud pulse telemetry signal to increase a signal-to-noise ratio of the mud pulse telemetry signal.

* * * * *